(12) United States Patent
Arditti Ilitzky et al.

(10) Patent No.: US 9,980,168 B2
(45) Date of Patent: May 22, 2018

(54) APPARATUS AND METHODS FOR POWER-SAVING LOW INTERMEDIATE FREQUENCY RECEIVER

(71) Applicant: Intel Corporation, Santa Clara, CA (US)

(72) Inventors: David Arditti Ilitzky, Guadalajara (MX); Thomas A. Tetzlaff, Portland, OR (US); Edgar Borrayo, Zapopan (MX); Stefano Pellerano, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 14/750,597

(22) Filed: Jun. 25, 2015

(65) Prior Publication Data

US 2016/0381643 A1    Dec. 29, 2016

(51) Int. Cl.
| | |
|---|---|
| *G08C 17/00* | (2006.01) |
| *H04W 24/10* | (2009.01) |
| *H04W 52/02* | (2009.01) |
| *H04B 1/06* | (2006.01) |

(52) U.S. Cl.
CPC ............ *H04W 24/10* (2013.01); *H04B 1/06* (2013.01); *H04W 52/02* (2013.01); *Y02B 60/50* (2013.01)

(58) Field of Classification Search
CPC ....... H04W 8/18; H04W 52/24; H04W 52/02; H04W 24/10; H04L 27/06; H04J 1/02; H04B 1/06
USPC ......................................... 370/311, 328, 281
See application file for complete search history.

(56) References Cited

U.S. PATENT DOCUMENTS

| | | | | |
|---|---|---|---|---|
| 7,050,419 B2 * | 5/2006 | Azenkot | ................. | H04L 5/026 370/347 |
| 8,761,307 B1 * | 6/2014 | Ionescu | ................. | H04L 1/0057 375/316 |
| 9,020,073 B2 * | 4/2015 | van Waasen | ............. | H04B 1/30 375/316 |

OTHER PUBLICATIONS

Bachmann, Christian, et al., "A 0.7V 200uW Multi-Standard Transeiver Digital Baseband in 40 nm LP-CMOS for 2.4GHz Bluetooth Smart", ISSCC 2014 Session 10 Moile Systems-O-Chips SoCs 10.6, (2014), 3 pgs.

(Continued)

*Primary Examiner* — Chi H Pham
*Assistant Examiner* — Alexander O Boakye
(74) *Attorney, Agent, or Firm* — Schwegman Lundberg & Woessner, P.A.

(57) ABSTRACT

This application discusses apparatus and methods of saving power using a quadrature receiver by enabling a single string reception mode of the quadrature receiver. In an example, a receiver for receiving communication information can include an analog front end configured to receive a modulated, information-carrying radio frequency signal at a first frequency band and to provide a digital representation of the modulated, information-carrying radio frequency signal at a second frequency band, a digital front end configured to receive the digital representation at the second frequency and to provide the communication information, for example, to a baseband processor. In a first processing mode of the receiver, the analog front end can provide either one of in-phase symbol information of the modulated, information-carrying radio frequency signal or quadrature symbol information of the modulated, information-carrying radio frequency signal at the second frequency band.

21 Claims, 6 Drawing Sheets

(56) References Cited

OTHER PUBLICATIONS

Zhang, Ye, et al., "Low-Effort High-Performance Viterbi-based Receiver for Bluetooth LE Applications", IEEE, (2013), 1930-1933.

* cited by examiner

APPARATUS AND METHODS FOR POWER-SAVING LOW INTERMEDIATE FREQUENCY RECEIVER

BACKGROUND

Communications solutions for low-power wireless sensor and actor networks (LP-WSAN) are continuing to make strides to meet ever shrinking power and cost budgets. These types of devices are becoming ubiquitous with the advent of wearable technologies and the internet of things (IoT). Many LP-NA/SAN devices are based on single carrier (narrowband) modulations like Gaussian frequency shift keying (GFKS), Gaussian minimum shift keying (GMSK), offset quadratic phase shift keying (O-QPSK), etc. Protocols can include but are not limited to, ANT, Bluetooth (BT), Bluetooth low-energy (BTE), ZigBee, Global System for Mobile Communications (GSM or 2G Cellular), etc. To achieve low-power, LP-W SAN devices tend toward low-overhead protocols with simple processing (less protocol fields in packet structure, simple or no-FEC, etc.), and low duty cycles (short packet sizes, long connectivity periods).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The inventors have recognized that the RF analog front end (AFE) of LP-WSAN devices is typically the most heavy power consumption component in single-carrier narrowband wireless receivers for complex modulations such as low intermediate frequency (IF) receiver devices. AFE power consumption can peak during LP-WSAN "hub" or "mesh" use-cases when a device may be slave of multiple devices and master of multiple devices. For example, in "hub" or "mesh" use-cases, the amount of wireless activity periods can be significantly greater than that of a simple sensor slave.

Due to protocol simplicity for some single carrier narrowband, wireless LP-WSAN technologies (i.e. for protocols without FEC like BLE or ANT), trading-off wireless receiver performance (sensitivity, packet error probability (PER)) for power reduction by degradation/simplification of the receiver AFE may be counter-productive, as a single bit-error will cause two packet retransmissions (one transmit retransmission and one receive retransmission). On single-digit PER (and higher) conditions, the power lost due to retransmissions may be higher than the active power reduced due to receiver AFE power optimizations.

Therefore, the inventors have recognized that high returns on active power reduction can be achieved by adaptively optimizing receiver AFE power consumption, for example, by applying AFE power optimizations that trade-off performance only when the key measurable properties of the channel (signal-to-noise ratio (SNR), adjacent channel interference (ACI) conditions, channel conditions) allows the average power per successfully communicated bit to be optimized. In some examples, AFE optimization can be applied when sensed conditions imply a high probability of correct packet reception such that additional power will probably not be required for reception error retransmissions. Such power saving can significantly increase user satisfaction as devices that rely on batteries or other energy storage supplies can operate for significantly longer between energy supply refreshment. Such devices include, but are not limited to, cell phones, smart phones, wearable electronics, internet of things (IoT) devices, and other devices intended for low data rate messaging by low power wireless embedded devices operating on a single coin-cell battery for months or years.

Figure 1:
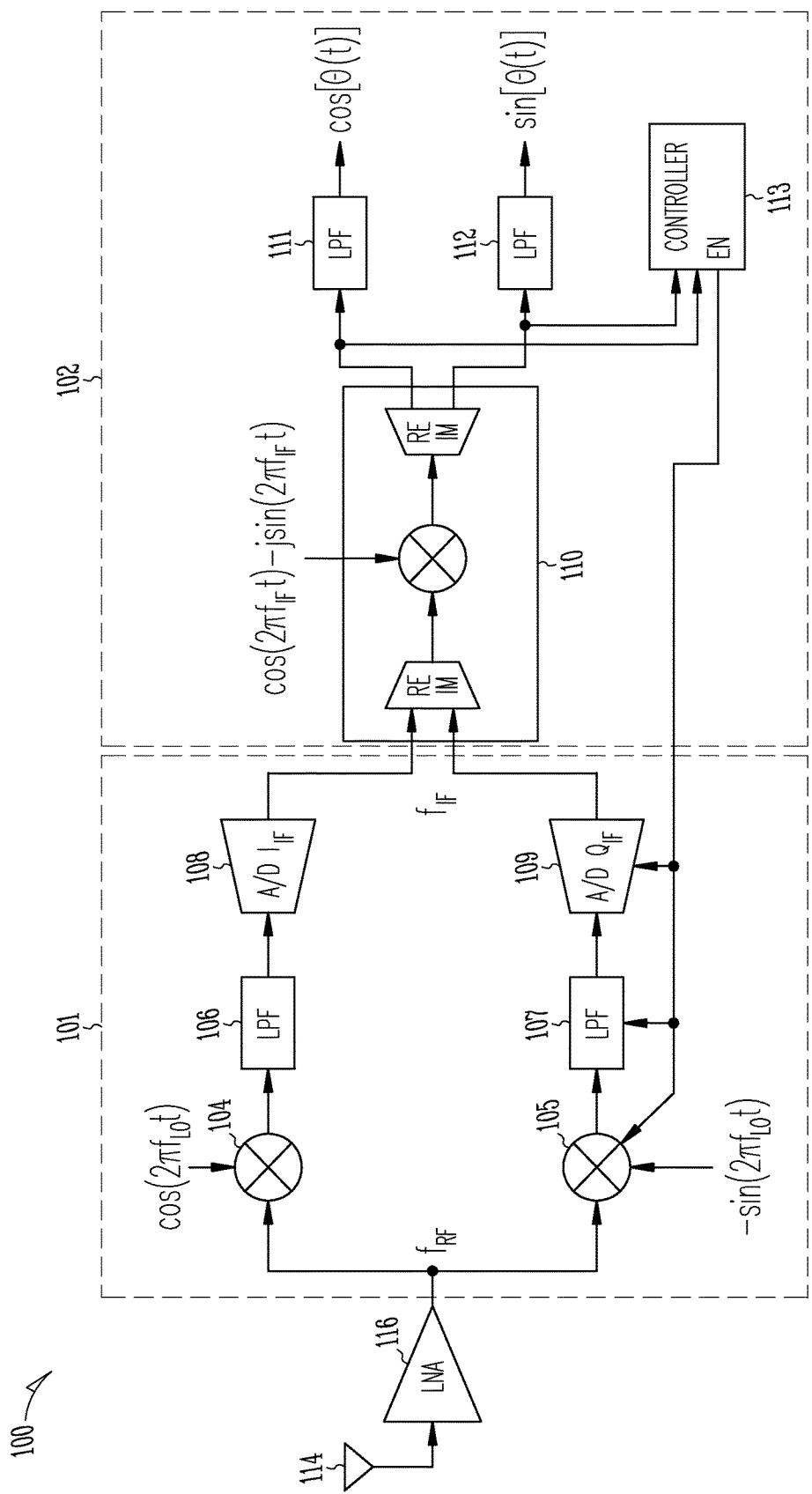
FIG. 1 illustrates generally an example receiver in accordance with some embodiments.

FIG. 1 illustrates generally an example receiver 100, such as a wireless receiver, including an AFE 101, a digital front end (DFE) 102 and a controller 103. In various examples, the receiver can receive a wireless signal at an antenna 114 and amplify the signal at an amplifier 116 for processing, such as down-converting, by the AFE 101 and DFE 102. In some examples, the amplifier 116 can include a low-noise amplifier (LNA). In certain examples, the AFE 101 can include analog mixers 104, 105, analog filters 106, 107 and analog-to-digital converters (ADC) 108, 109. The DFE 102 can include a complex digital multiplier 110 and one or more digital filters 111, 112. In certain examples, the AFE 101 can receive a modulated, information-carrying radio frequency signal with a carrier frequency ($f_{RF}$) from an antenna 114 and can divide the signal into two quadrature processing chains, one for processing in-phase symbol information (I) and one for processing quadrature symbol information (Q), for example. In certain examples, the one or more analog mixers 104, 105 can receive local oscillator signals (cos($2\pi f_{LO}t$), $-\sin(2\pi f_{LO}t)$) and can decompose the modulated, information-carrying radio frequency signal into analog, in-phase symbol information ($I_{IF}$) and analog, quadrature phase symbol information ($Q_{IF}$) each having an intermediate frequency band centered at an intermediate frequency ($f_{IF}$). The analog filters 106, 107 can suppress or attenuate out-of-band noise or interference that is outside the intermediate frequency band. The one or more ADCs can convert the analog symbol information ($I_{IF}$, $Q_{IF}$) to digital symbol information for the DFE 102. In certain low-IF receiver architectures, the carrier frequency ($f_{RF}$) and the intermediate frequency ($f_{IF}$) can be related to the local oscillator frequency ($f_{LO}$), for example, by either, $$f_{RF} = f_{LO} + f_{IF},$$

or $$f_{RF} = f_{LO} - f_{IF}.$$

The DFE 102 can continue down-converting the symbol information ($I_{IF}$, $Q_{IF}$) having the intermediate frequency band centered about the intermediate frequency (IF) to communication information having a frequency band centered about zero hertz, or zero-frequency, baseband information. The digital multiplier 110 can include a digital mixer that can receive a complex oscillator signal ($\cos(2\pi f_{IF}t)-j \sin(2\pi f_{IF}t)$) and can recompose a complex signal using the input symbol information ($I_{IF}$, $Q_{IF}$) and can decompose the communication information at zero hertz ($\cos[\theta(t)]$, $\sin[\theta(t)]$). In certain examples, when reception characteristics are robust, the complex digital multiplier 110 can receive a single chain of digital symbol information from the AFE 101 at the intermediate frequency and can still recompose the complete zero-frequency baseband or communication information ($\cos[\theta(t)]$, $\sin[\theta(t)]$).

In certain examples, the digital front-end (DFE) 102 decimation/filtering chain can include a controller 113 for measuring the received power at the intermediate frequency band, as well as, received power at one or more image frequency bands that can be passed through the receiver 100. Image frequency bands can also be referred to as blocker bands. In certain examples, power received at the blocker bands can significantly distort the ability of the complex digital multiplier 110 to accurately reconstruct the complex signal information from a single chain of analog symbol information. In certain examples, the controller 113 can estimate a signal-to-noise ratio (SNR) for the receiver using measurements of received in-band power. Although not so limited, in certain applications, the IF can be chosen to be close to the signal of interest bandwidth such that the digital oversampling frequency can be as low as possible which, in turn, can result in sample processing power consumption being kept to a minimum.

In certain examples, the controller 113 can include an output (EN) for enabling and disabling one of the two processing chains of the AFE. Although having both processing chains enabled can provide better reception performance in terms of low probabilities associated with reception errors, disabling one of the processing chains can save a substantial amount of power. For example, reception of communication packets can roughly be broken into two broad processing steps including coherence acquisition and packet processing. In a conservative estimate, if coherence acquisition takes 10% of the packet time, single chain operation for a receiver AFE can reduce active power consumption by about 20% resulting in a conservative power saving of 18% for a packet. If coherence acquisition time is estimated to be only 5% of the packet time, single chain operation for a receiver AFE can reduce active power consumption by about 40% resulting in a power reduction of about 38% for a packet. In certain examples, when a processing chain is disabled, the analog mixer, analog filters and ADC of AFE associated with the disabled processing chain can be powered off. In certain examples, other circuitry associated with the processing chain such as, but not limited to, additional filters, or local oscillator generation and distribution circuitry can also be powered-off.

Figure 2:
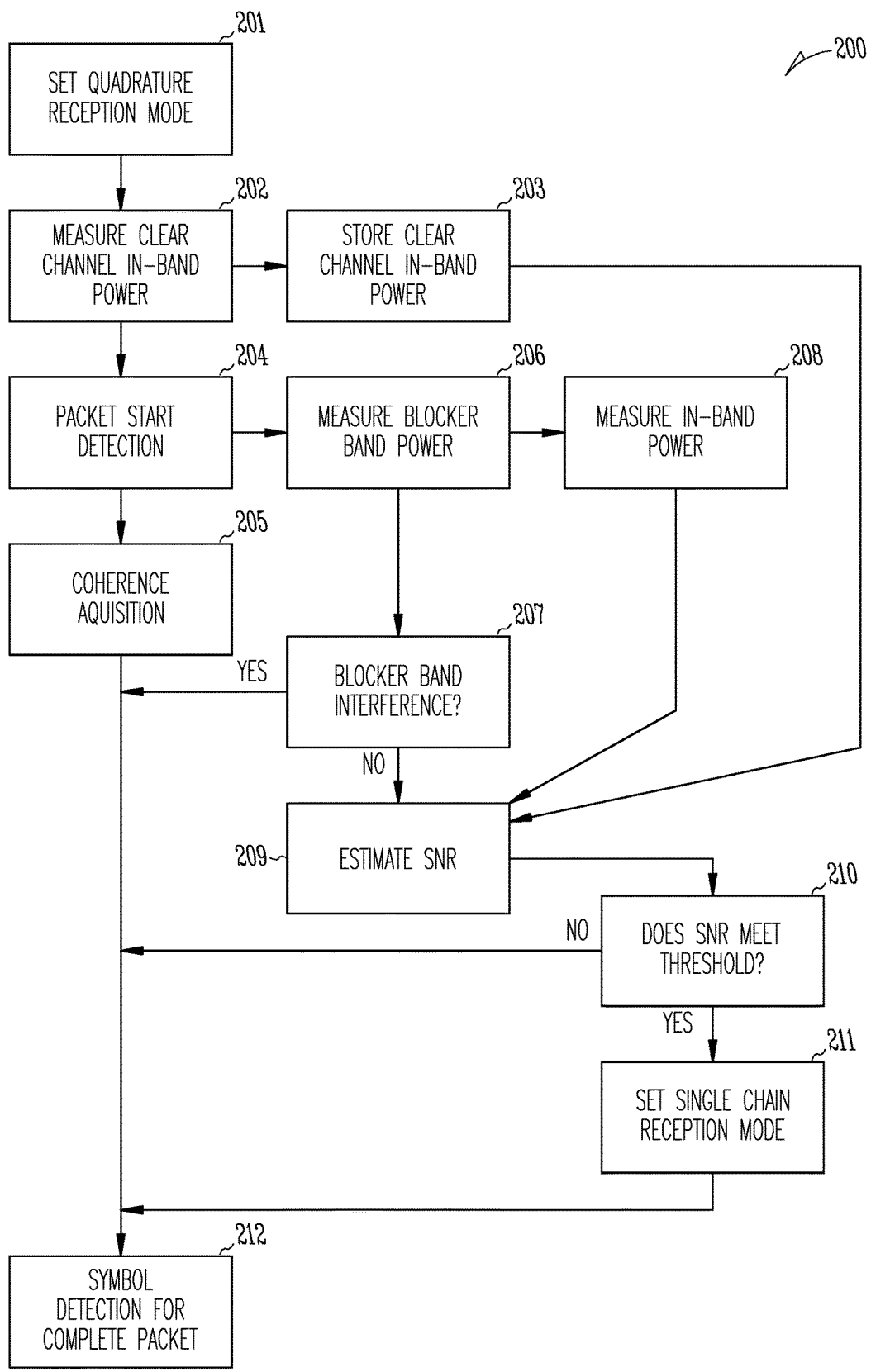
FIG. 2 illustrates generally a flowchart of an example method for operating a quadrature receiver to save power in accordance with some embodiments.

FIG. 2 illustrates generally a flowchart of an example method 200 for operating a quadrature low-IF wireless receiver to save power. At 201, the receiver AFE is enabled to operate in quadrature mode as opposed to single chain operation. At 202, in-band power can be measured and stored at 203 when the receiver channel is clear using a controller receiving digital symbol information from the AFE in the intermediate frequency band. In certain examples, the channel is clear when no packet information is expected at that time, thus, noise and in-band interference are typically the only signal information present. At 204, the receiver can begin detecting a packet of communication data. While coherence of the signal is being acquired at 205, at 206, the controller can measure blocking band power. If the blocker band power measurement is of a sufficient strength at 207, the controller can keep the AFE in quadrature mode to receive the packet. At 208, in-band power can be measured and at 209 an estimate for SNR can be determined using the initial clear channel in-band power measurement. In certain examples, an estimation circuit such as an estimation circuit of the controller can determine the estimate for the SNR as well as other estimates discussed herein. In certain examples, measurement of in-band power at 208 during packet acquisition can be initiated in parallel with measurement of blocking band power. In some examples, if the blocking band power does not reach a first threshold at 207, in-band power can be subsequently measured at 208. In such examples, if the power measurement is of a sufficient strength for the receiver to remain in quadrature mode, the controller may not initiate in-band power measurements and may not estimate SNR. At 210, if the SNR satisfies a second threshold for converting to single chain reception mode, the controller can enable single chain operation of the AFE at 211, for example, by disabling one of the AFE processing chains. If the SNR does not satisfy the second threshold, the receiver can remain in quadrature mode. At 212, regardless of operating mode, the receiver detects symbols from the received packets.

In certain examples, the decision to switch to single chain operation mode of the AFE can be determined by estimating the error rate of the single channel communication link and comparing the estimated energy usage using single chain processing, including energy usage associated with estimated error transmissions and corresponding retransmissions, and energy usage using quadrature mode. In certain examples, the interference energy of the blocking bands and the estimated SNR can be used to estimate an error rate for single chain AFE operation. In certain examples, the method of FIG. 2 can offer instantaneous transition from quadrature to single chain operation without producing a transient effect or any transient effect associated with a switch from quadrature reception mode to single chain reception mode can be corrected by digital compensation based on other measurable channel conditions.

Figure 3:
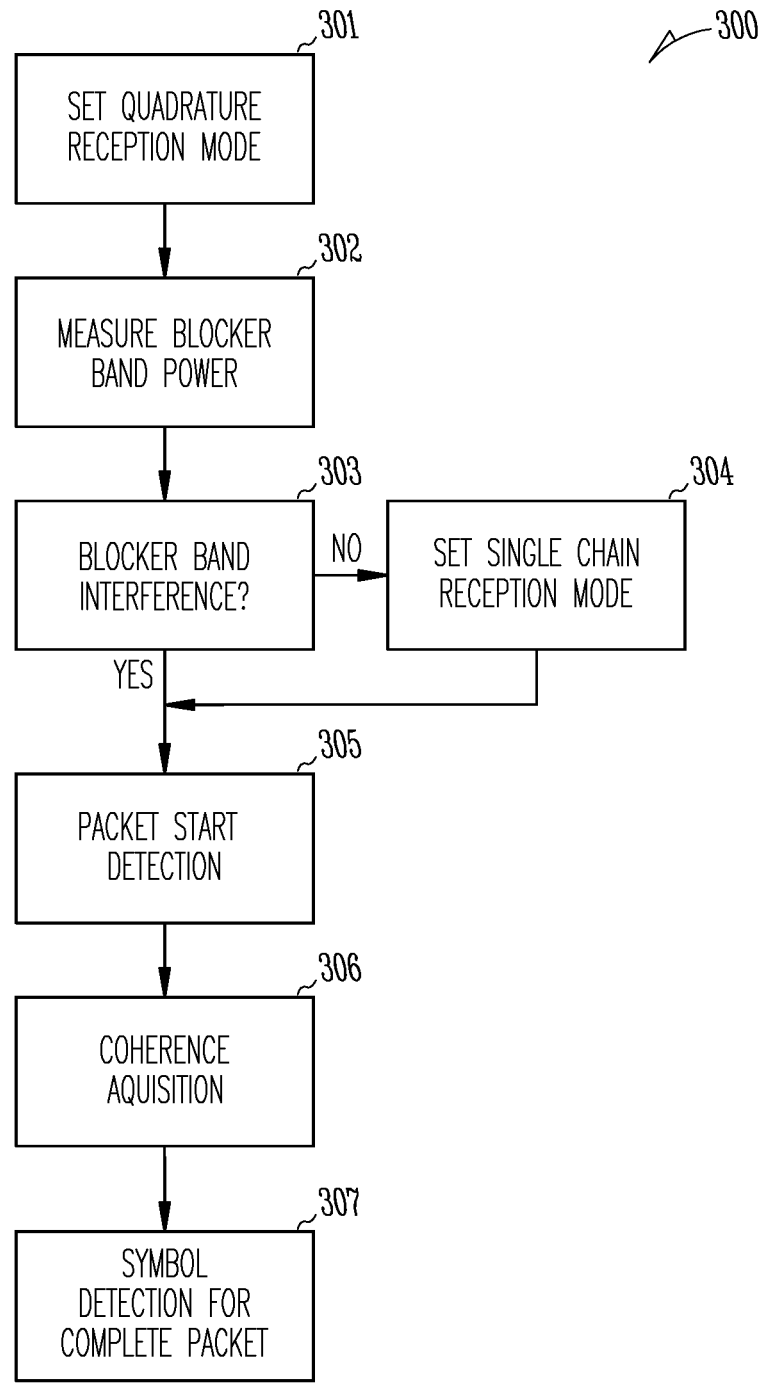
FIG. 3 illustrates generally a flow chart of an example method 300 for saving operational power of a quadrature receiver in accordance with some embodiments.

FIG. 3 illustrates generally a flow chart of an example method 300 for transitioning a quadrature wireless receiver between an AFE quadrature reception mode and an AFE single chain reception mode using power measurements of one or more blocking bands. At 301, the receiver AFE is enabled to operate in quadrature mode as opposed to single chain operation. At 302, power measurements of one or more blocker bands are initiated. In certain examples, the blocker band power measurements can be initiated before an expected packet time and concluded just before the start time of the reception of the expected packet. If no significant blocking band interference is detected at 303, the AFE can be switched to single chain reception at 304 just before the start time of the expected packet. At 305, regardless of operating mode of the AFE, the receiver can begin detecting the start of a packet. At 306, coherence can be acquired. At 307, symbols can be detected by the receiver. Compared to the example method of FIG. 2, the method of FIG. 3 is less processing intensive but should be enabled outside of packet reception because the transition from quadrature to single chain reception can have negative transient effects on the receivers' ability to accurately receive and process communication symbols.

Figure 4:
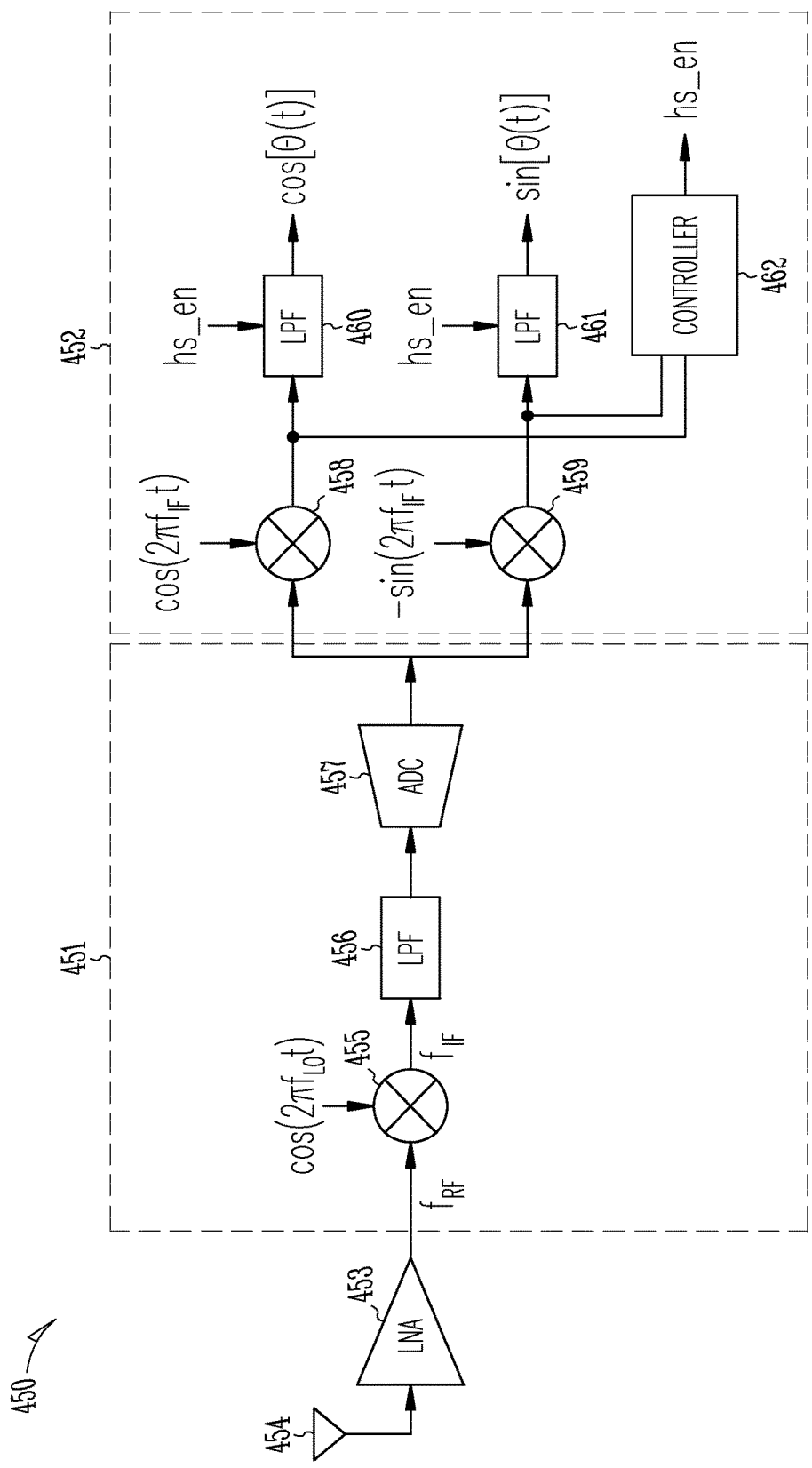
FIG. 4 illustrates generally an example receiver with a single analog front end processing chain in accordance with some embodiments.

In some products, especially products where extended battery life can be beneficial, an example low-energy receiver architecture can include a single processing chain for reception and decomposition of quadrature communication symbols. FIG. 4 illustrates generally an example receiver 450 with a single AFE processing chain. The receiver can include a single-chain AFE 451 and a dual chain DFE 452. The single-chain AFE 451 can include a reception amplifier 453 for receiving a wireless modulated, information-carrying radio frequency signal from an antenna 454, an analog mixer 455, an analog filter 456 and an ADC 457. The analog mixer 455 can receive a mixer oscillator signal ($\cos(2\pi f_{LO} t)$) and can convert the received modulated, information-carrying radio frequency signal having a first center frequency ($f_{RF}$), or carrier frequency, to a complex analog signal having an intermediate center frequency ($f_{IF}$). In certain examples, the analog filter 456 of the single-chain AFE 451 can include a low pass filter to attenuate or suppress signal energy outside of the intermediate frequency band. The ADC 457 can provide a digital representation of the intermediate frequency signal to the DFE 452. The DFE 452 can complete the down-conversion of the received single chain signal to zero frequency baseband quadrature information signal (cos [θ(t)], sin [θ(t)]).

The DFE 452 can include digital mixers 458, 459 for receiving digital oscillator signals ($\cos(2\pi f_{IF} t)$, $-\sin(2\pi f_{IF} t)$) and down-converting the digital representation of the intermediate frequency signal to provide the zero frequency baseband information (cos θ(t), sin θ(t)). Several types of DFE 452 can be implemented, including but not limited to, CORDIC based down conversion, look-up table (LUT) based down-conversion, etc. In certain examples, a "Hilbert Transform" based reception scheme using a single IF-Hilbert filter can be used instead of two Zero-IF low-pass filters (LPFs) 459, 460 as shown in FIG. 4. FIG. 4 is an illustrative example and does not limit the present subject matter to any particular digital down-conversion scheme. In certain examples, a low-energy receiver architecture can include, but is not limited to, a Bluetooth Low Energy (Bluetooth Smart) receiver, for example, configured to receive wireless signals having a first frequency band in a range of about 2.400 gigahertz (GHz) to about 2.4835 GHz and having 40-2 megahertz (MHz) channels and to down-convert to an intermediate frequency band having frequencies between 450 kilohertz (kHz) and 550 kHz.

Figure 5:
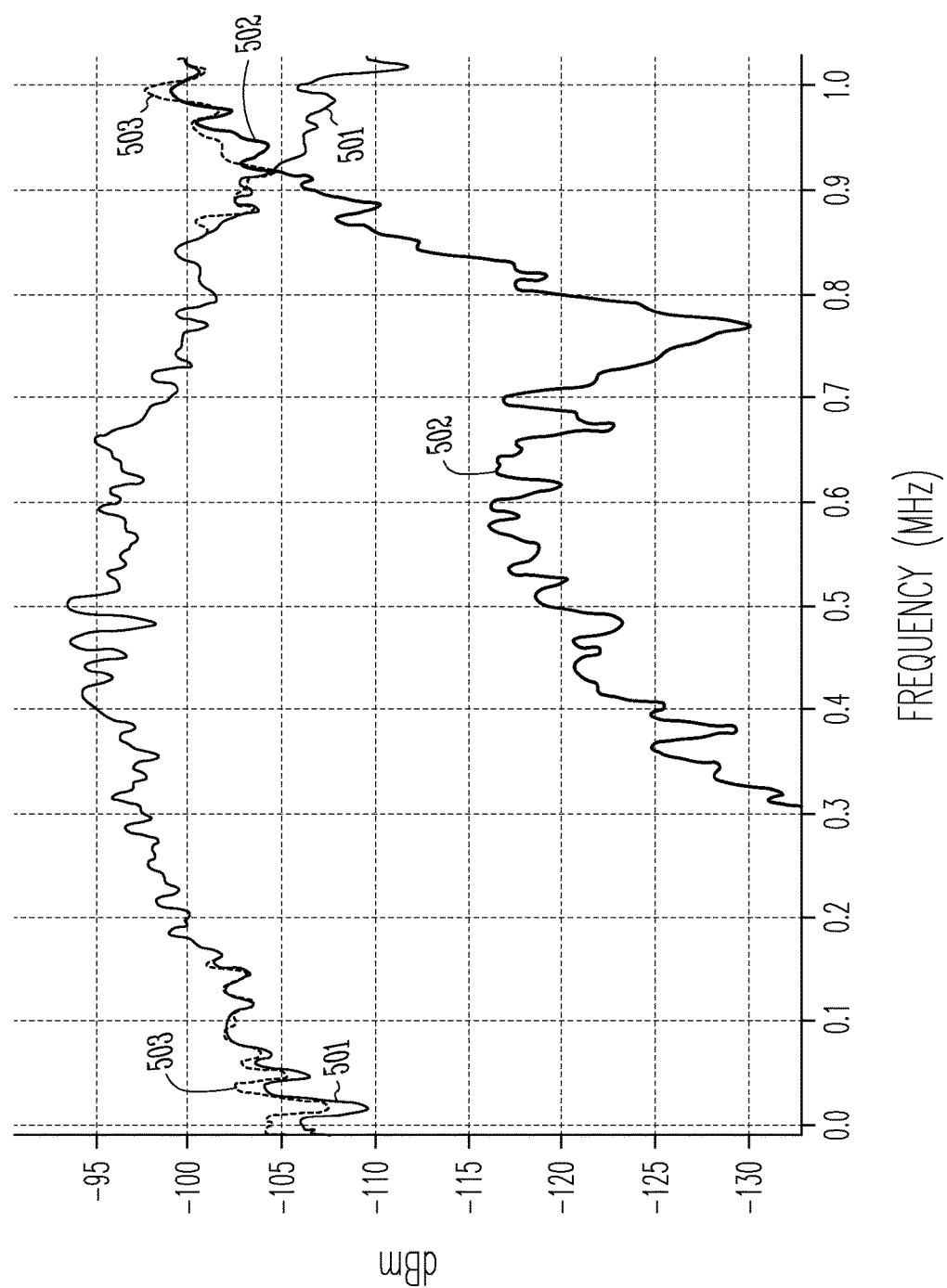
FIG. 5 illustrates generally a plot of a desired signal down converted to 500 kHZ with a 1 MHz bandwidth.

One optional feature of a digital down-conversion scheme or DFE 452 can be one or more tunable baseband filters 460, 461. FIG. 5 illustrates generally a plot of a desired signal, such as Bluetooth Low Energy (BLE) signal, down-converted to 500 kHZ with a 1 MHz bandwidth 501, blocker band interference or adjacent channel interference (ACI) and self-interference 502, and the signal 503 resulting from reception using a single chain AFE. Near 0.92 MHz, the desired signal can be overwhelmed by leakage power of the image-adjacent interference from the blocker bands. In certain examples, the optional tunable filters 460, 461 can include a frequency response that is tunable or configurable between at least two discrete responses such as, but not limited to, a highly selective response for image-adjacent interference scenarios, and a less selective response for other cases. In such examples, a controller 462 of the receiver can adapt a filtering cut-off frequency of the filters 460, 461 to a location near the point where the interference-leakage power within the in-band frequencies is higher than the signal of interest power (e.g. near 0.92 MHz as seen in FIG. 5). The selectable filters 460, 461 can enable a further reduction on the performance penalty in the presence of ACI. In addition to the tunable or configurable filters 460, 461 the controller 462 or a digital PHY controller can receive an intermediate filtered digital signal that does not have the adjacent channel completely filtered out. The controller 462, or an estimation circuit, can simultaneously estimate in-band power and extended passband power, and by comparing both power estimations, the adjacent channel power can be estimated also. If the adjacent channel power is high enough (so that its leakage is can be assumed to be high on the band of interest), the digital filtering response can be tuned or configured, for example via an output of the controller (hs_en), to be more selective. In some examples, a look-up table type of tuning set point can be used to provide multiple tuning steps based on different estimates of ACI power.

Figure 6:
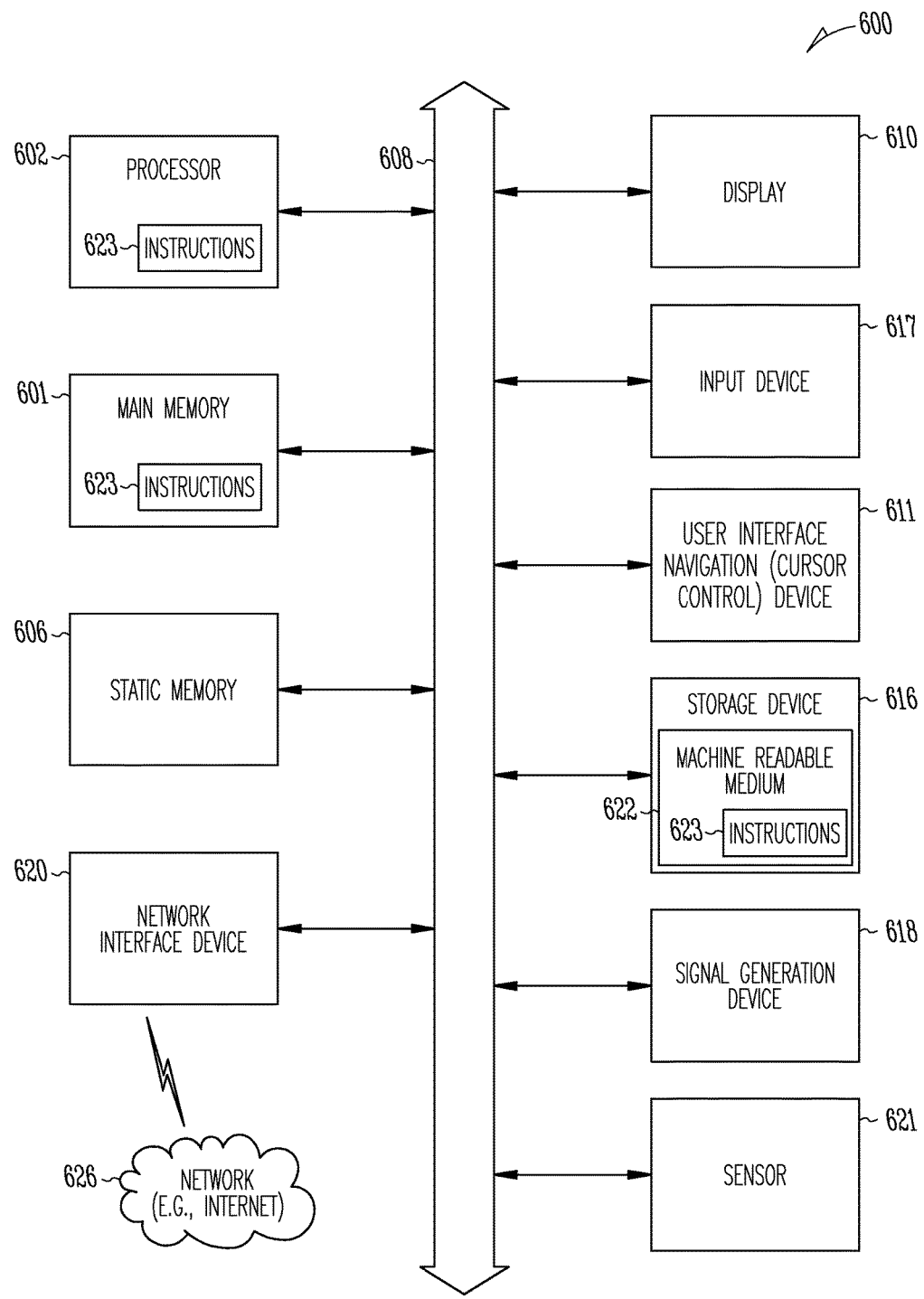
FIG. 6 is a block diagram illustrating an example machine upon which any one or more of the methodologies herein discussed may be run in accordance with some embodiments.

FIG. 6 is a block diagram illustrating an example machine upon which any one or more of the methodologies herein discussed may be run. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, wearable electronics, internet of things (IoT) devices, such as, but not limited to, IoT sensors and IoT actuators, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes a processor 602 (e.g., a central processing unit (CPU), a graphics processing unit (GPU) or both), a main memory 601 and a static memory 606, which communicate with each other via a bus 608. The computer system 600 may further include a display unit 610, an alphanumeric input device 617 (e.g., a keyboard), and a user interface (UI) navigation device 611 (e.g., a mouse). In one embodiment, the display, input device and cursor control device are a touch screen display. In certain examples, the computer system 600 may additionally include a storage device (e.g., drive unit) 616, a signal generation device 618 (e.g., a speaker), a network interface device 620, and one or more sensors 621, such as a global positioning system sensor, compass, accelerometer, or other sensor.

The storage device 616 includes a machine-readable medium 622 on which is stored one or more sets of data structures and instructions 623 (e.g., software) embodying or utilized by any one or more of the methodologies or functions described herein. The instructions 623 may also reside, completely or at least partially, within the main memory 601 and/or within the processor 602 during execution thereof by the computer system 600, the main memory 601 and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 623. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Electrically Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 623 may further be transmitted or received over a communications network 626 using a transmission medium via the network interface device 620 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

In certain examples, the central processor 602 can include one or more processors or processor circuits including a processing circuit configured to remove irrelevance from phase-modulated carrier signals of the example computer system 600.

Additional Notes

In Example 1, a receiver can include an analog front end configured to receive a modulated, information-carrying signal at a first frequency band and to provide a digital representation of the modulated, information-carrying signal at a second frequency band, the modulated, information-carrying signal including communication information, a digital front end configured to receive the digital representation at the second frequency band and to down-convert the digital representation to provide the communication information, and wherein, in a first processing mode, the analog front end provides either, or only, one of in-phase symbol information of the modulated, information-carrying signal or quadrature symbol information of the modulated, information-carrying signal at the second frequency band.

In Example 2, the receiver of Example 1 optionally employs a low-energy architecture configured to receive wireless signals having a first frequency band in a range of about 2.400 gigahertz (GHz) to about 2.4835 GHz and having forty, 2 megahertz (MHz) channels.

In Example 3, the second frequency band of any one or more of Examples 1-2 optionally is between 450 kilohertz (kHz) and 550 kHz.

In Example 4, the receiver of any one or more of Examples 1-3 optionally includes an estimation circuit configured to provide an intermediate filtered digital signal, to simultaneously estimate power within the second frequency band, power in frequencies adjacent to the second frequency band and if leakage power associated with frequencies adjacent to the second frequency band exists in the second frequency band, and if the leakage power exists in the second frequency band, to estimate a cut-off frequency within the second frequency band where adjacent channel interference power is higher than a threshold determined using the estimated power within the second frequency band.

In Example 5, the digital front end any one or more of Examples 1-4 optionally includes one or more digital baseband filters configured to provide the communication information, to attenuate information outside the second frequency band in the first processing mode of operation and to attenuate information outside the cut-off frequency in a second processing mode of operation.

In Example 6, in a second processing mode, the analog front end of any one or more of Examples 1-5 optionally provides both the in-phase symbol information and the quadrature symbol information at the second frequency band.

In Example 7, the receiver of any one or more of Examples 1-6 optionally includes a controller configured to enable the first processing mode of the analog front end and to simultaneously disable the second processing mode.

In Example 8, the controller of any one or more of Examples 1-7 optionally is configured, in the second processing mode, to measure received power at one or more image frequency bands to provide measurements of image band power.

In Example 9, the controller of any one or more of Examples 1-8 optionally is configured to switch from the second processing mode to the first processing mode if the image band power is below a threshold indicative of the first processing mode saving energy compared with operation in the second processing mode.

In Example 10, the controller of any one or more of Examples 1-9 optionally is configured, in the second processing mode, to measure received power at the second frequency to provide in-band power measurements.

In Example 11, the controller of any one or more of Examples 1-10 optionally is configured to estimate the received signal to noise ratio (SNR) in the first processing mode using the in-band power measurement and the image band power measurement and to switch from the second processing mode to the first processing mode if the estimated SNR is below a threshold indicative of the first processing mode saving energy compared with operation in the second processing mode.

In Example 12, the analog front-end of any one or more of Examples 1-11 optionally includes a plurality of analog-to-digital converters (ADCs) and at least one ADC of the plurality of ADCs is disabled in the first processing mode and is enabled in the second processing mode.

In Example 13, the analog front-end of any one or more of Examples 1-12 optionally includes a plurality of analog mixers and at least one analog mixer of the plurality of analog mixers is disabled in the first processing mode and is enabled in the second processing mode.

In Example 14, the analog front-end of any one or more of Examples 1-13 optionally includes a plurality of analog filters and at least one analog filter of the plurality of analog filters is disabled in the first processing mode and is enabled in the second processing mode.

In Example 15, a method for processing wireless signals with reduced energy consumption can include receiving a modulated information-carrying signal having a first frequency band at an analog front end of a wireless receiver, the modulated, information-carrying signal including communication information, down-converting the modulated information-carrying signal to provide a digital representation of the modulated, information-carrying signal using at least an analog-to-digital converter (ADC) of the analog front-end, the digital representation having a second frequency band, receiving the digital representation at a digital front-end of the wireless receiver, and processing or down-converting the digital representation to provide the communication information, such as zero-frequency communication or baseband information, wherein providing the digital representation includes, in a first processing mode of the receiver, providing either, or only one of, in-phase symbol information of the modulated, information-carrying signal or quadrature symbol information of the modulated, information-carrying signal.

In Example 16, the receiving the quadrature signal of any one or more of Examples 1-15 optionally includes receiving wireless signals having a first frequency band in a range of about 2.400 gigahertz (GHz) to about 2.4835 GHz and having 40-2 megahertz (MHz) channels.

In Example 17, the second frequency band of any one or more of Examples 1-16 optionally includes frequencies between 450 kilohertz (kHz) and 550 kHz.

In Example 18, the providing the digital representation of any one or more of Examples 1-17 optionally includes, in a second processing mode of the receiver, providing the in-phase symbol information and the quadrature symbol information to the digital front-end.

In Example 19, the method of any one or more of Examples 1-18 optionally includes estimating image-band interference of the modulated, information-carrying using a measurement circuit configured to receive the in-phase symbol information and the quadrature symbol information during the second processing mode from the analog front end.

In Example 20, the method of any one or more of Examples 1-19 optionally includes switching the analog front end from the second processing mode to the first processing mode if the estimate of image band interference satisfies an interference threshold.

In Example 21, the switching the analog front end from the second processing mode to the first processing mode of any one or more of Examples 1-20 optionally includes disabling one or more components of the analog front-end to reduce power consumption of the wireless receiver.

In Example 22, the method of any one or more of Examples 1-21 optionally includes estimating a signal-to-noise ratio (SNR) of the quadrature signal using a measurement circuit configured to receive the in-phase symbol information and the quadrature symbol information during the second processing mode from the analog front end.

In Example 23, the method of any one or more of Examples 1-22 optionally includes switching the analog front end from the second processing mode to the first processing mode if the estimate of SNR satisfies a SNR threshold.

In Example 24, the switching the analog front end from the second processing mode to the first processing mode of any one or more of Examples 1-23 optionally includes disabling one or more components of the analog front-end to reduce power consumption of the wireless receiver.

In Example 25, an apparatus for a wireless communication device can include analog front end circuitry configured to receive a modulated, information-carrying signal at a first frequency band and to provide a digital representation of the modulated, information-carrying signal at a second frequency band, the modulated, information-carrying signal including communication information, digital front end circuitry to receive the digital representation at the second frequency band and to provide the communication information, and processing circuitry to configure the front-end circuitry to operate in either a first or second processing mode, wherein in the first processing mode, the analog front end is configured to provide either in-phase symbol information of the modulated, information-carrying signal or quadrature symbol information of the modulated, information-carrying signal at the second frequency band, and wherein, in a second processing mode, the analog front end is configured to provide both the in-phase symbol information and the quadrature symbol information at the second frequency band.

In Example 26, the processing circuitry of any one or more of Examples 1-25 optionally is configured to switch from the second mode to the first mode when an image band power is below a threshold and wherein, in the first mode, a portion of the analog front end circuitry is power off.

Example 27 can include, or can optionally be combined with any portion or combination of any portions of any one or more of Examples 1 through 26 to include, subject matter that can include means for performing any one or more of the functions of Examples 1 through 26, or a machine-readable medium including instructions that, when performed by a machine, cause the machine to perform any one or more of the functions of Examples 1 through 26.

The above detailed description includes references to the accompanying drawings, which form a part of the detailed description. The drawings show, by way of illustration, specific embodiments in which the present subject matter can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments of the present subject matter should be determined with reference to the appended claims, along with the full scope of equivalents to which such claims are legally entitled.

What is claimed is:

1. A receiver comprising:
   an analog front end configured to receive a modulated, information-carrying signal at a first frequency band and to provide a digital representation of the modulated, information-carrying signal at a second frequency band, the modulated, information-carrying signal including communication information;
   a digital front end configured to receive the digital representation at the second frequency band and to down-convert the digital representation to provide the communication information; and
   wherein, in a first processing mode, the analog front end provides only one of in-phase symbol information of the modulated, information-carrying signal or quadrature symbol information of the modulated, information-carrying signal, at the second frequency band;
   wherein, in the first processing mode, only a single analog mixer of the analog front end is enabled.

2. The receiver of claim 1, wherein the receiver employs a low-energy architecture configured to receive wireless signals having a first frequency band in a range of about 2.400 gigahertz (GHz) to about 2.4835 GHz and having forty, 2 megahertz (MHz) channels.

3. The receiver of claim 2, wherein the second frequency band is between 450 kilohertz (kHz) and 550 kHz.

4. The receiver of claim 1, including an estimation circuit configured:
   to receive an intermediate filtered digital signal;
   to simultaneously estimate power within the second frequency band and power in frequencies adjacent to the second frequency band of the intermediate filtered digital signal; and
   to estimate a cut-off frequency within the second frequency band where adjacent channel interference power is higher than a threshold determined using the estimated power within the second frequency band if leakage power associated with frequencies adjacent to the second frequency band exists in the second frequency band.

5. The receiver of claim 1, wherein the digital front end includes one or more digital baseband filters configured to provide the communication information, to attenuate information outside the second frequency band in the first processing mode of operation and to attenuate information outside the cut-off frequency in a second processing mode of operation.

6. The receiver of claim 1, wherein, in a second processing mode, the analog front end provides both the in-phase symbol information and the quadrature symbol information at the second frequency band.

7. The receiver of claim 6, including a controller configured to enable the first processing mode of the analog front end and to simultaneously disable the second processing mode.

8. The receiver of claim 7, wherein the controller is configured, in the second processing mode, to measure received power at one or more image frequency bands to provide measurements of image band power.

9. The receiver of claim 8, wherein the controller is configured to switch from the second processing mode to the first processing mode if the image band power is below a threshold indicative of the first processing mode saving energy compared with operation in the second processing mode.

10. The receiver of claim 8, wherein the controller is configured, in the second processing mode, to measure received power at the second frequency to provide in-band power measurements.

11. The receiver of claim 10, wherein the controller is configured to estimate the received signal to noise ratio (SNR) in the first processing mode using the in-band power measurement and the image band power measurement and to switch from the second processing mode to the first processing mode if the estimated SNR is below a threshold indicative of the first processing mode saving energy compared with operation in the second processing mode.

12. The receiver of claim 6, wherein the analog front-end includes a plurality of analog-to-digital converters (ADCs) and at least one ADC of the plurality of ADCs is disabled in the first processing mode and is enabled in the second processing mode.

13. The receiver of claim 6, wherein the analog front-end includes a plurality of analog mixers and at least one analog mixer of the plurality of analog mixers is disabled in the first processing mode and is enabled in the second processing mode.

14. The receiver of claim 6, wherein the analog front-end includes a plurality of analog filters and at least one analog filter of the plurality of analog filters is disabled in the first processing mode and is enabled in the second processing mode.

15. A method for processing wireless signals with reduced energy consumption, the method comprising;
   receiving a modulated information-carrying signal having a first frequency band at an analog front end of a wireless receiver, the modulated, information-carrying signal including communication information;
   providing a digital representation of the modulated, information-carrying signal using an analog-to-digital converter (ADC) of the analog front-end, the digital representation having a second frequency band;
   receiving the digital representation at a digital front-end of the wireless receiver; and
   processing the digital representation to provide the communication information;
   wherein providing the digital representation includes, in a first processing mode of the receiver, enabling a single analog mixer of the analog front end, and providing only one of in-phase symbol information of the modulated, information-carrying signal or quadrature symbol information of the modulated, information-carrying signal.

16. The method of claim 15, wherein providing the digital representation includes, in a second processing mode of the receiver, providing the in-phase symbol information and the quadrature symbol information to the digital front-end.

17. The method of claim 16, including estimating image-band interference of the modulated, information-carrying using a measurement circuit configured to receive the in-phase symbol information and the quadrature symbol information during the second processing mode from the analog front end.

18. The method of claim 16, including switching the analog front end from the second processing mode to the first processing mode if the estimate of image band interference satisfies an interference threshold.

19. The method of claim 18, wherein the switching the analog front end from the second processing mode to the first processing mode includes disabling one or more components of the analog front-end to reduce power consumption of the wireless receiver.

20. An apparatus for a wireless communication device, the apparatus comprising:
   analog front end circuitry configured to receive a modulated, information-carrying signal at a first frequency band and to provide a digital representation of the modulated, information-carrying signal at a second frequency band, the modulated, information-carrying signal including communication information;
   digital front end circuitry to receive the digital representation at the second frequency band and to provide the communication information;
   processing circuitry to configure the front-end circuitry to operate in either a first or second processing mode, wherein in the first processing mode, the analog front end is configured to provide only one of either in-phase symbol information of the modulated, information-carrying signal or quadrature symbol information of the modulated, information-carrying signal, at the second frequency band, and wherein, in a second processing mode, the analog front end is configured to provide both the in-phase symbol information and the quadrature symbol information at the second frequency band; and
   wherein the processing circuitry is configured to switch from the second mode to the first mode when an image band power is below a threshold and wherein, in the first mode, a portion of the analog front-end circuitry is powered off.

21. The apparatus of claim 20, wherein the processing circuitry is configured to switch from the first mode to the second mode when an image band power is above a threshold.

* * * * *